US012721367B2

(12) United States Patent
Mollo et al.

(10) Patent No.: US 12,721,367 B2
(45) Date of Patent: Sep. 1, 2026

(54) PROCESS FOR PRODUCING A FOODSTUFF PRODUCT HAVING A DECORATION

(71) Applicant: SOREMARTEC S.A., Senningerberg (LU)

(72) Inventors: Marco Mollo, Senningerberg (LU); Giovanni Aragone, Senningerberg (LU); Romilbert Guastalli, Senningerberg (LU)

(73) Assignee: SOREMARTEC S.A., Senningerberg (LU)

( * ) Notice: Subject to any disclaimer, the term of this patent is extended or adjusted under 35 U.S.C. 154(b) by 1128 days.

(21) Appl. No.: 17/829,978

(22) Filed: Jun. 1, 2022

(65) Prior Publication Data

US 2022/0395013 A1 Dec. 15, 2022

(30) Foreign Application Priority Data

Jun. 10, 2021 (IT) ........................ 102021000015266

(51) Int. Cl.
*A23P 20/25* (2016.01)
*B05C 5/02* (2006.01)
*B05C 13/00* (2006.01)

(52) U.S. Cl.
CPC ............ *A23P 20/25* (2016.08); *B05C 5/0225* (2013.01); *B05C 13/00* (2013.01)

(58) Field of Classification Search
CPC ...... A21C 9/04; A23G 1/0063; A23G 1/0066; A23G 1/305; A23G 1/54; A23G 3/0025;
(Continued)

(56) References Cited

U.S. PATENT DOCUMENTS

2004/0130593 A1 7/2004 Decorte
2005/0211108 A1* 9/2005 Carabin ................ A23G 3/203 99/468

(Continued)

FOREIGN PATENT DOCUMENTS

CN 109318609 A 2/2019
CN 111213768 A 6/2020

(Continued)

OTHER PUBLICATIONS

Extended European Search Report issued for European Patent Application No. 22175761.0 on Oct. 18, 2022, 14 pages.
Italian Search Report issued for Italian Patent Application No. 202100015266 on Feb. 2, 2022, 13 pages.

*Primary Examiner* — Ibrahime A Abraham
*Assistant Examiner* — Joseph W Iskra
(74) *Attorney, Agent, or Firm* — Rothwell, Figg, Ernst & Manbeck, P.C.

(57) ABSTRACT

A process for producing foodstuff products provided with a respective decoration having a given configuration, the process including the steps of:

making a plurality of foodstuff products each having a surface cavity and a profile in plan view that is predetermined to reproduce the given configuration of the respective decoration;

advancing the foodstuff products on a conveying line in a direction of advance;

via a camera, detecting, for each foodstuff product, the respective cavity;

determining one or more data indicating a volume of the cavity of the foodstuff product;

providing a fluid foodstuff material dispensing unit, including a plurality of rows of nozzles transverse to the direction of advance;

(Continued)

dispensing an amount of fluid foodstuff material in the cavity of each foodstuff product substantially equal to the volume of the cavity.

18 Claims, 8 Drawing Sheets

(58) Field of Classification Search
CPC .... A23G 3/0065; A23G 3/007; A23G 3/0097; A23G 3/203; A23G 3/28; A23G 3/343; A23G 9/24; A23P 20/18; A23P 20/25; B05C 13/00; B05C 5/0225; G01F 11/38
USPC ............................................................ 99/494
See application file for complete search history.

(56) References Cited

U.S. PATENT DOCUMENTS

| | | | | |
|---|---|---|---|---|
| 2013/0011523 | A1* | 1/2013 | Belzowski | A21C 9/04 426/89 |
| 2019/0030887 | A1 | 1/2019 | Veis et al. | |
| 2020/0163357 | A1 | 5/2020 | Mansuino et al. | |

FOREIGN PATENT DOCUMENTS

| | | | |
|---|---|---|---|
| EP | 2003982 | A2 | 12/2008 |
| EP | 3415877 | * | 12/2018 |
| EP | 3415877 | A1 | 12/2018 |
| EP | 3656221 | A1 | 5/2020 |
| EP | 2003982 | * | 12/2020 |
| WO | 2007115050 | A2 | 10/2007 |

* cited by examiner

PROCESS FOR PRODUCING A FOODSTUFF PRODUCT HAVING A DECORATION

CROSS REFERENCE TO RELATED APPLICATION(S)

This application claims priority to Italian Patent Application No. 102021000015266, filed Jun. 10, 2021. The entirety of the disclosure of the above-referenced application is incorporated herein by reference.

TEXT OF THE DESCRIPTION

The present invention relates to a method for producing a foodstuff product having a decoration.

According to the prior art, a first type of processes for decoration of foodstuff products envisages dispensing a foodstuff cream on a surface of the product so as to reproduce a desired graphic representation.

A second type of processes envisages, instead, carrying out, once again on a surface of the product, an operation of printing using a food-grade ink to reproduce the desired graphic representation.

Known processes of the first type referred to suffer from the drawback of presenting a limited capacity of graphic reproduction both in terms of complexity of the representation and in terms of precision and quality of the representation obtained. Moreover, the volumes of material that can be dispensed on the various parts of one and the same product are somewhat limited. On the other hand, the decorations obtained are weakly fixed to the product so that they may detach easily, for example, in the case of impact or vibrations.

The second type of decoration processes referred to above suffers, instead, from the drawback of using substances that in themselves provide a low—if not zero—contribution to the organoleptic character of the foodstuff product. Moreover, these substances frequently contain additives in general, and this may reduce the pool of consumers interested in products thus obtained.

In this context, the present invention proposes a new process for producing a decorated foodstuff product, which affords a series of advantages over the known processes discussed above, as will emerge from what follows.

In particular, the present invention regards a process having the characteristics recalled in Claim 1.

The present invention moreover regards a system according to Claim 10.

The claims form an integral part of the teaching provided herein.

Further characteristics and advantages of the invention will emerge clearly from the ensuing description with reference to the annexed drawings, which are provided purely by way of non-limiting example and in which:

FIG. 2 is a top plan view of a part of the system of FIG. 1;

FIGS. 9A and 9B are a schematic illustration of a foodstuff product in two successive steps of the process described herein according to an example of application;

FIG. 10 represents an example of foodstuff product used for the process described herein; and FIG. 11 represents an example of foodstuff product obtained via the process described herein.

Figure 1:
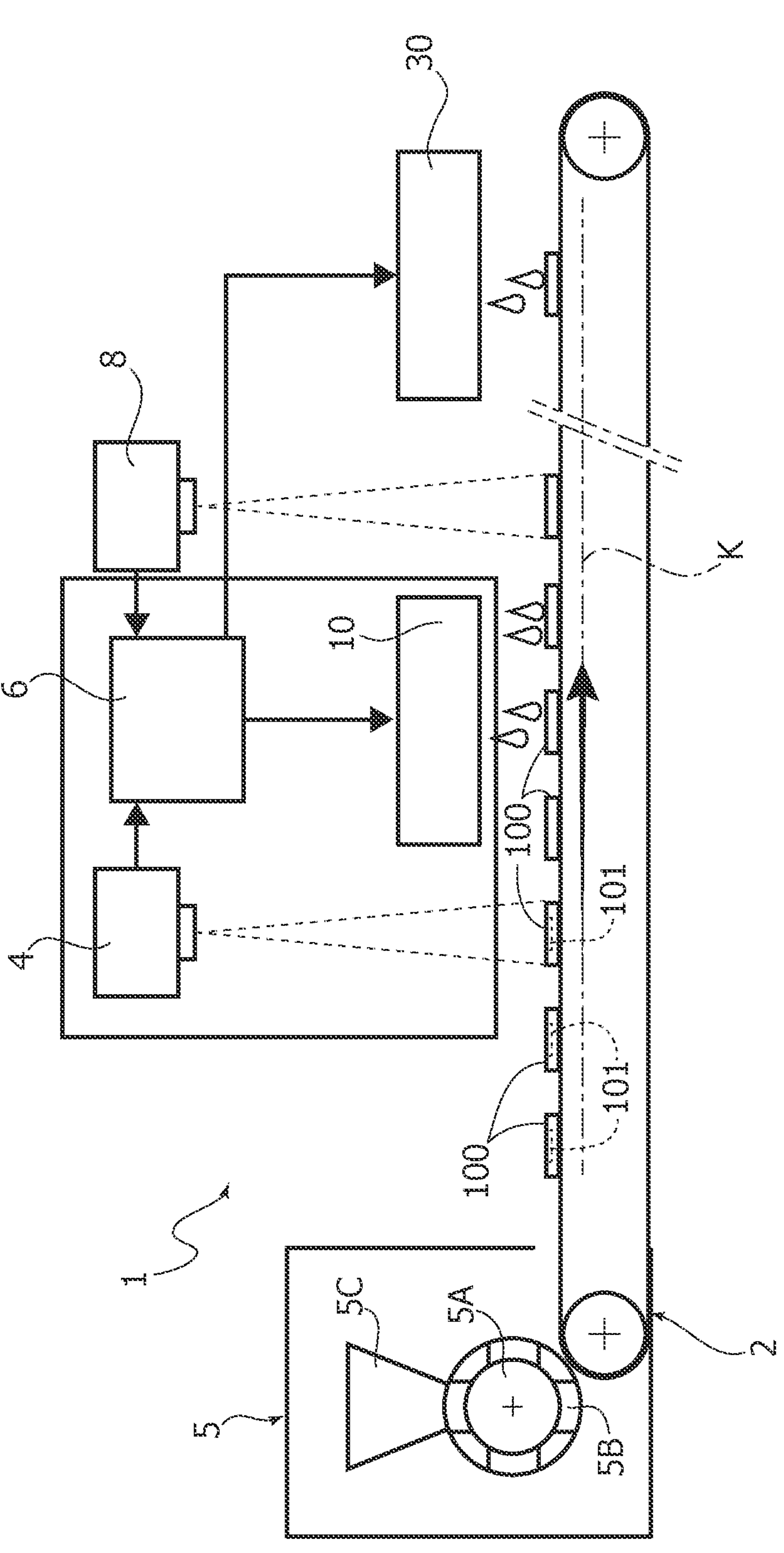
FIG. 1 is a schematic illustration of a preferred embodiment of the system described herein.

In the ensuing description various specific details are illustrated aimed at enabling an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As anticipated above, the solution described herein regards a process for producing foodstuff products provided with a decoration having a given configuration.

The foodstuff products can be, for example, oven-baked products, confectionery products, ice-creams, etc.

It is to be understood that the teaching provided herein may apply to foodstuff products of any type, as will become evident in what follows.

In general, the process described herein comprises the steps of:

- making a plurality of foodstuff products each having a surface and at least a cavity made on said surface and having a profile in plan view that is predetermined to reproduce the given configuration of the respective decoration,
- making said plurality of foodstuff products advance on a conveying line, along a direction of advance;
- via a camera, detecting, for each foodstuff product, the corresponding cavity;
- on the basis of data obtained from the detection by means of the camera, determining one or more data indicating a volume of the cavity of the foodstuff product;
- providing along the conveying line at least one unit for dispensing a fluid foodstuff material, which comprises a plurality of rows of nozzles arranged in a direction transverse to the direction of advance;
- selecting a set of nozzles of the plurality of rows of nozzles through which to dispense the fluid foodstuff material, as a function of the one or more data indicating a volume of the cavity determined previously; and
- dispensing in the cavity of each foodstuff product an amount of fluid foodstuff material substantially equal to the volume of the cavity of the foodstuff product, through the selected set of nozzles,
- wherein the fluid foodstuff material is dispensed through the selected nozzles at respective pre-set times and while the foodstuff product on the conveying line advances underneath the plurality of rows of nozzles.

In view of the foregoing, the process described herein envisages, in the first place, making foodstuff products each provided with at least one cavity having a predetermined profile in plan view, which is destined to receive the fluid foodstuff material by means of which the planned decoration is reproduced; the predetermined profile of the cavity corresponds to the shape of the decoration or of a portion of the decoration.

The cavities in question execute the function of providing a reference to the dispensing means apt to dispense the fluid foodstuff material, for enabling these means to dispense a correct quantity of fluid foodstuff material and according to a predefined distribution, in order to facilitate reproducing of the planned decoration and render the implementation of the process described herein versatile, as it will be said in the following.

Figures 9A, 9B, 10, 11:
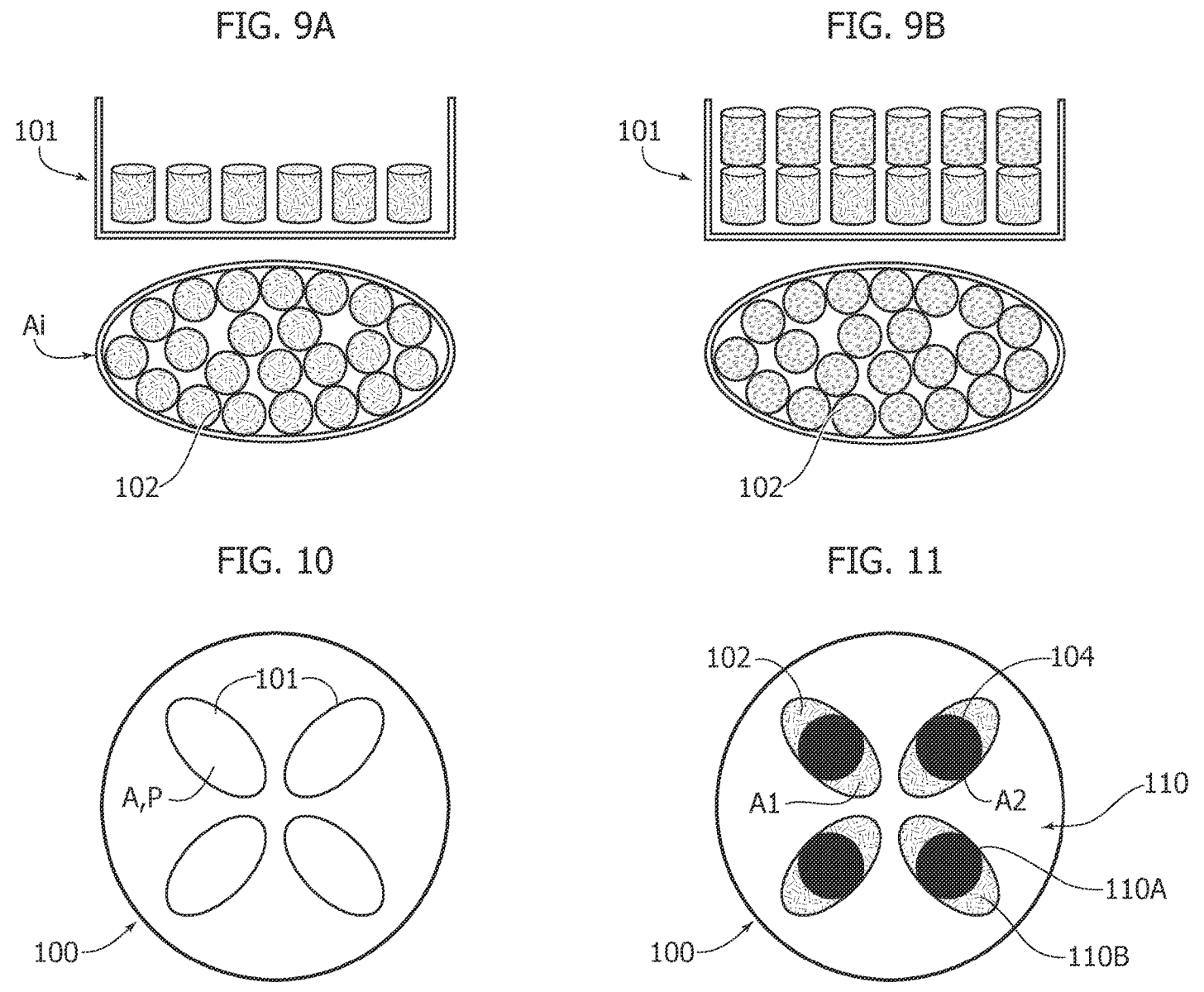

In this connection, FIG. 11 represents an example of decorated foodstuff product, which is made via the process described herein, while FIG. 10 represents the same foodstuff product made in the process described herein and yet to be decorated.

The foodstuff product of the example illustrated—designated as a whole by the reference number 100—has a decoration formed by four almond-shaped elements 110 which are radially arranged and each have a central circle 110A surrounded by a region 110B of different color. The central circle 110A and the surrounding region 110B are respectively reproduced by means of two different fluid foodstuff materials.

According to the example in question, the process described herein, first of all, includes making the foodstuff product 100A comprising four cavities 101 that are provided with a predefined shape in plan view corresponding to the almond shape of the elements 110, and are reciprocally arranged according to the same radial arrangement of the four elements 110.

The cavities 101 each have a pre-set volume V given by the area A of the bottom of the cavity multiplied by the depth P of the cavity itself.

The area A depends upon the shape and the extension of the cavity 101 and may hence vary, of course, from one application to another.

On the other hand, as seen above, the depth P of the cavity 101 may even be extremely limited, for example between 1 mm and 2 mm, since the main function of the cavity 101 is to define a pre-set volume to be filled with the fluid foodstuff material.

As indicated above, the cavities 101 are then detected by a camera and the process described herein includes controlling the dispensing unit apt to dispense the fluid foodstuff material, as a function of data indicating the volume of the cavities 101, obtained from the detection step executed by means of the camera.

It should be noted that in this way the dispensing unit is able to adapt directly and automatically its own operation for making foodstuff products with different decorations during one and the same process.

FIGS. 1 to 4 illustrate an example of system for implementing the process described herein.

The system illustrated—designated as a whole by the reference number 1—comprises:

- a unit 5 for making the foodstuff products 100 having the cavities 101;
- a conveying line 2 for making the plurality of products 100 leaving the unit 5 advance along a direction of advance K;
- at least one camera 4 for detecting the cavities 101 of the products 100 advancing on the conveying line 2 along the direction of advance K;
- at least one unit 10 for dispensing fluid foodstuff material inside the cavities 101 of the products 100.

The unit 5 can be, for example, a forming unit apt to form or mold a dough, for example a dough for an oven-baked product, particularly a biscuit, or any other base material for preparing a foodstuff material, which can be a mix of ingredients or even a single ingredient.

For example, the unit 5 can comprise means for cutting, molding and extruding to treat a dough or another base material.

In the example of FIG. 1, the unit 5 is constituted by a rotary machine for molding biscuits comprising a rotating roller 5A on the outer surface of which a plurality of cavities 5B are provided, which are configured to define respective moulds for forming single biscuits starting from a biscuit dough supplied to the roller 5A by a hopper 5C. On the bottom of the cavities 5B protrusions (not illustrated) are provided that form the cavities 101 to be provided on the products 100. Clearly, the unit 5 can be of any other type.

In general, the unit 5 can be a conventional machine for making shaped foodstuff products, whose type will vary on the basis of the specific type of foodstuff product to make.

With specific reference to the dispensing unit 10, this comprises a plurality of rows of nozzles 11 arranged in a direction transverse to the direction of advance K.

In preferred embodiments, like the one illustrated, the dispensing unit 10 comprises a plurality of dispensing heads 12, each including a row of nozzles 11 set in a direction transverse to the direction of advance K.

The dispensing heads 12 are arranged according to a matrix configuration that extends in the direction of advance K and in a direction H orthogonal thereto. In this way, an arrangement of rows of nozzles are provided constituted by series 11A of rows of nozzles 11 aligned in the direction H, which follow one another in the direction of advance K.

Preferably, the rows of nozzles 11 are oriented in respective directions J parallel to one another and inclined with respect to the direction of advance K, preferably by an angle □ comprised between 3° and 15°, even more preferably between 7° and 10°, with respect to the direction of advance K. In general, the angle □ can be selected as a function of the definition of representation that is to be obtained: the smaller the angle, the higher the definition that can be achieved.

Figure 8:
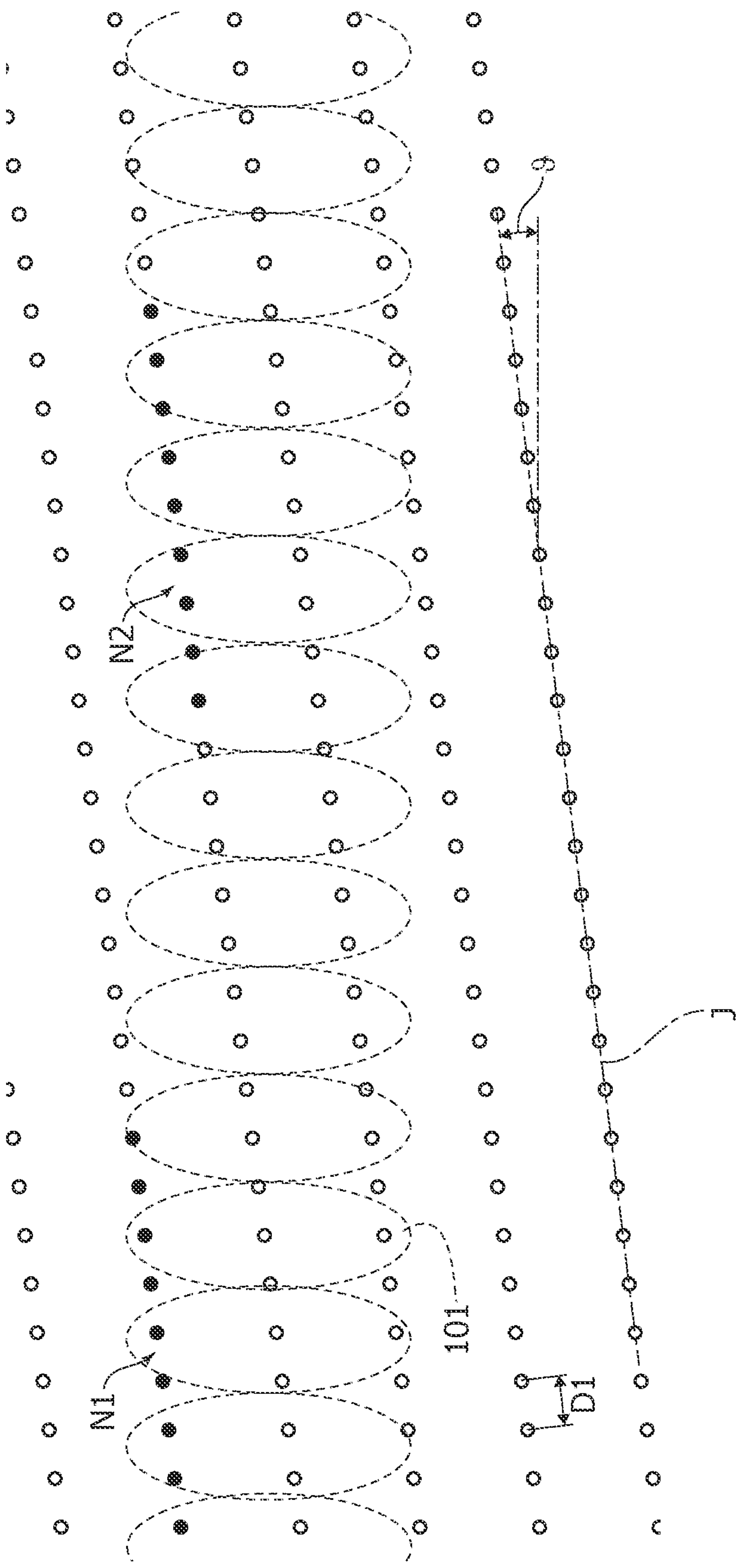
FIG. 8 is a schematic illustration of two successive steps of the process described herein according to an example of application.

In preferred embodiments, like the one illustrated, the rows of nozzles 11 are identical to one another, presenting in particular an equal number of nozzles 11', which are set apart from one another by a distance D1 that is the same for all the rows of nozzles (see FIG. 8).

Figure 2:
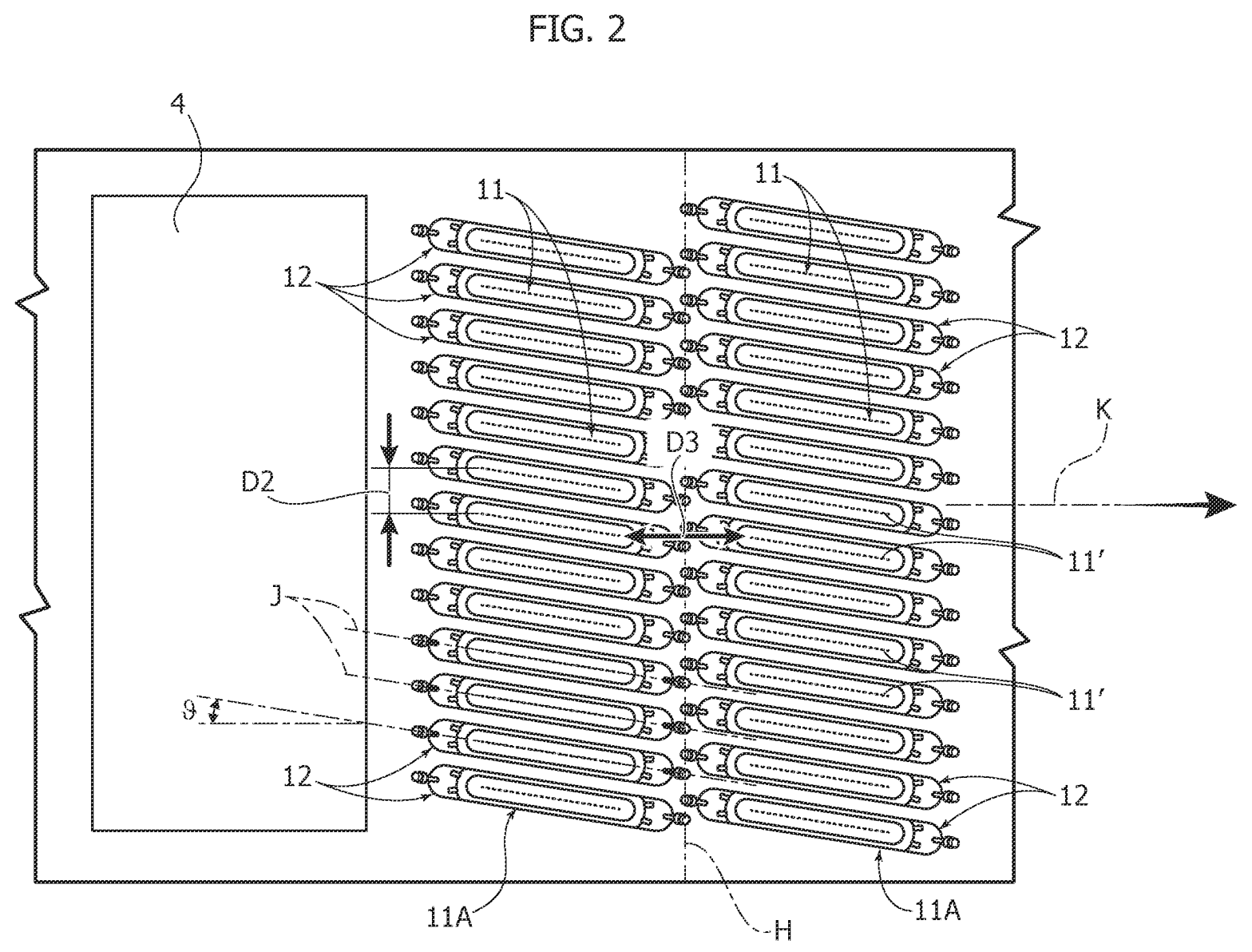

In preferred embodiments, like the one illustrated, the rows of nozzles of one and the same series 11A are equally spaced apart from one another, in the direction H, by a given distance D2 (see FIG. 2).

In preferred embodiments, like the one illustrated, the series 11A of rows of nozzles that follow one another in the direction K are equally spaced apart from one another by a given distance D3 (see FIG. 2).

Moreover, in preferred embodiments, like the one illustrated, each series 11A is offset with respect to the series that precedes it (with reference to the direction of advance K); in particular, it is shifted in the direction H so that the first nozzle of each row of the series (except for an end row) is substantially aligned, in the direction of advance K, with the last nozzle of a corresponding row of the series that precedes it, and the last nozzle of each row of the series is aligned, in the direction K, with the first nozzle of a corresponding row of the series that precedes it, or vice versa (see FIG. 2).

In this way, it is guaranteed that within two consecutive series 11A a constant and uniform distribution of nozzles 11' is obtained in the direction H, for the entire width of the dispensing unit 10.

Among other things, it will be noted that the effective distance between the individual nozzles in the direction H is equal to the distance D1 multiplied by the sine of the angle □ (FIG. 8).

Preferably, the number of dispensing heads 11 may be a function of the width of the representation that is to be obtained.

The arrangement of nozzles described above makes it possible to obtain with the material deposited on the product a representation with a graphic resolution of at least 70 DPI, preferably at least 100 DPI.

The dispensing unit 10 comprises valve devices 20 associated to the nozzles 11' to control dispensing of the fluid foodstuff material through them.

The valve devices 20 are prearranged for being controlled individually and independently of one another.

In this way, fluid foodstuff material can be dispensed through each nozzle in pre-set amounts and at pre-set times that may differ from those of the other nozzles.

Figure 7:
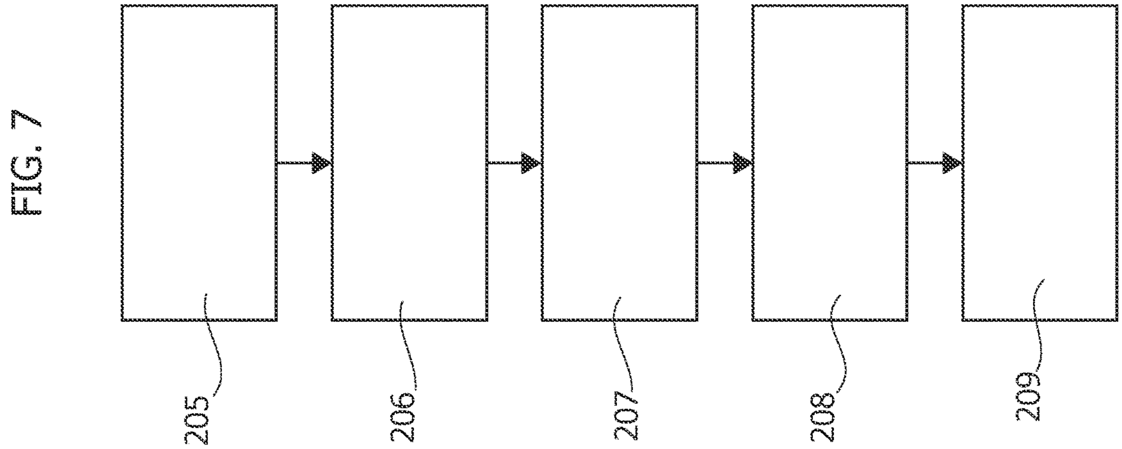
FIG. 7 represents a further flowchart regarding the process described herein according to a preferred embodiment.
Figure 6:
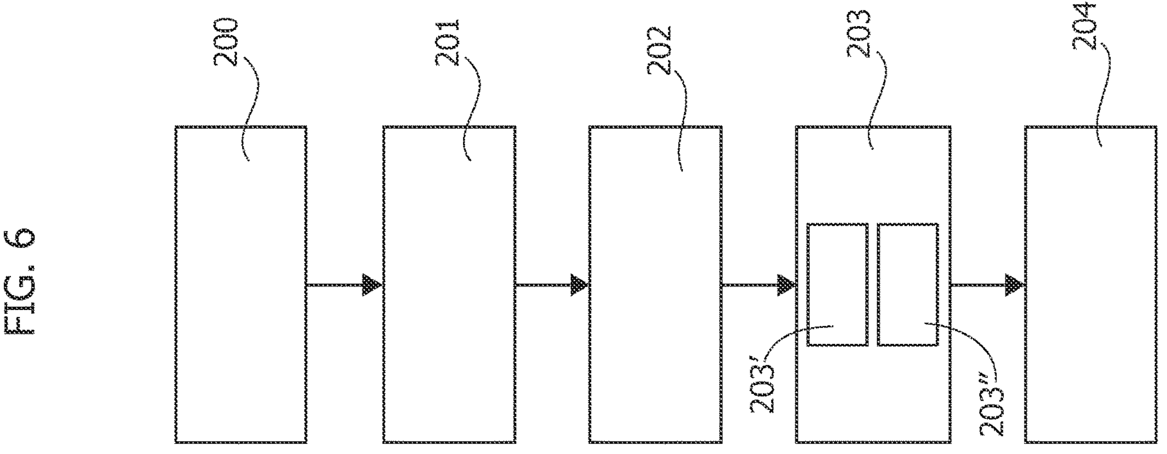
FIG. 6 represents a flowchart regarding the process described herein according to a preferred embodiment.

By way of example, FIGS. 6 and 7 illustrate by means of a block diagram implementation of the process described herein to obtain the product of FIG. 10.

With reference to FIG. 6, the process described herein includes making the foodstuff products 100 (step 200) and then detecting via the camera 4 the cavities 101 of the products 100 while these are brought to the dispensing unit 10 by the conveying line 2 (step 201).

The system 1 comprises a control unit 6 configured for processing the signals received from the camera 4 in order to obtain one or more data indicating the volume of the individual cavity 101 (step 202).

Preferably, the control unit 6 determines the area in plan view A and the depth P of the cavity 101.

For this purpose, the control unit 6 may include a storage unit stored on which is an image-processing software that is able to obtain data on the volume (for example, the values of A and P referred to above) of the cavity 101 on the basis of the images sent by the camera 4.

The software in question may be any known computer program that is commercially available and suited for the purposes referred to.

On the basis of the data A, P obtained, the control unit 6 is configured for selecting the nozzles of the dispensing unit 10 that will dispense the fluid foodstuff material in the cavity 101, filling it completely (step 203).

The selection is made so that the nozzles selected carry out dispensing of the fluid foodstuff material while the product 100 continues to advance in the direction K, without ever stopping.

In a first step (step 203'), the control unit 6 identifies a first set of nozzles N1 on the basis of the area A determined, which are located in respective positions within the matrix described above such that the nozzles can dispense as a whole fluid foodstuff material to cover substantially the entire area A.

Selection of the set of nozzles N1 is hence made on the basis of the shape and size of the area A.

It should now be noted that the nozzles are controlled for carrying out dispensing of fluid foodstuff material with an opening time determined as a function of the rate of advance of the foodstuff product. From the theoretical standpoint, the fluid foodstuff material dispensed may hence be represented schematically as a cylinder having a base of area Ai and a height Hi (FIG. 9). The base Ai depends upon the section of outflow of the nozzle. The height Hi depends instead upon the opening time of the dispensing nozzle.

Consequently, in the step referred to above the control unit 6 selects a set of nozzles N1 to deliver a set of cylinders of foodstuff material that come to cover entirely the bottom of the cavity 101, setting themselves on the aforesaid bottom alongside one another (image a) of FIG. 9).

In a subsequent step (step 203"), the control unit 6 checks whether the cylinders in question can have a height Hi equal to the depth P of the cavity 101.

The person skilled in the sector will understand that this depends upon the rate of advance of the products 100 on the conveying line 2: in fact, the higher the rate of advance of the products 100, the shorter the time in which the cavity 101 is kept, with respect to the individual nozzle, in the correct position for dispensing of the fluid foodstuff material in the pre-set position within the cavity 101. Incidentally, it should be noted that, considering the constant movement of the products 100, the positions referred to will in actual fact be pre-defined circumscribed regions.

The control unit 6 then checks whether the rate of the conveying line 2 is such as to enable delivery of cylinders having a height Hi equal to the depth P.

If they do, the nozzles will be able to deliver cylinders of foodstuff material having a height H1 equal to the depth P, and the set of nozzles N1 will by itself carry out dispensing of the fluid foodstuff material into the cavity 101.

If they do not, the control unit 6 proceeds, instead, to identifying a second set of nozzles N2 in order to deliver a further set of cylinders of fluid foodstuff material substantially equal to the set of cylinders to be delivered by the set of nozzles N1. In the dispensing operation, the second set of cylinders will set itself on top of the first set, thus forming a multilayer structure (image b) of FIG. 9).

The step described above is repeated until the control unit 6 determines that the set of the layers of cylinders associated to the sets of nozzles already selected has reached a height equal to the depth P of the cavity 101. It should be noted that not necessarily does the cavity 101 have to be filled up to the top rim of the cavity 101 itself, so that, in general, the step described can be repeated until the cavity 101 is filled with a pre-defined amount of material.

Once the nozzles necessary for filling the cavity 101 have been selected, the control unit 6 issues a command to the valve devices 20 to carry out dispensing of the pre-set amount of material (step 204).

In the figures, the fluid foodstuff material dispensed is designated as a whole by the reference number 102. With reference to the illustrated example, the material 102 reproduces region 110B of decoration 110 (FIG. 11).

For the nozzles selected, the control unit determines pre-set dispensing times, which can vary from one nozzle to another as a function of the position of the individual nozzle within the dispensing unit 10, i.e., more in general, as a function of its position within the plurality of rows of nozzles provided.

As already mentioned above, each nozzle is selected to dispense fluid foodstuff material in a given point of the cavity 101, and hence, in the dispensing operation, it is activated in a time interval in which the cavity 101 is located underneath the nozzle in a relative position suitable for dispensing the fluid foodstuff material in a pre-set position within the cavity 101.

Taking into account this general criterion, the nozzles of the individual sets N1, N2, etc. can be selected from among the various dispensing heads 11 in an altogether variable way according to the specific requirements and circumstances of each dispensing operation.

For instance, the nozzles of one and the same set may belong to one and the same dispensing head 11 or else to different dispensing heads. Likewise, two distinct sets of nozzles may include nozzles of one and the same dispensing head or else of different dispensing heads.

Preferably, the nozzles of the sets N1, N2, etc. are selected so that, in the dispensing operation, fluid foodstuff material will first be dispensed by the nozzles of the first set N1 and only subsequently will the foodstuff material be dispensed by the nozzles of the further set N2; the same splitting of the dispensing operation is maintained between the set N2 and a possible further set, and so forth.

By way of example, FIG. 8 represents two sets of nozzles N1, N2 selected for filling one and the same region of a cavity 101. The nozzles of each set are selected from among different dispensing heads 11, and the nozzles of the second set N2 are all downstream of the nozzles of the set N1 with respect to the direction of advance K. In this way, the nozzles of the second set N2 dispense the fluid foodstuff material only after the set of nozzles N1 has completed its dispensing operation.

With reference to FIG. 7, in a preferred embodiment, the process described here envisages dispensing a second fluid foodstuff material on the first fluid foodstuff material deposited in the cavities 101.

This second material—designated in the figures by the reference 104—is provided for completing the decoration of the product 100 and, consequently, is dispensed so as to provide a further graphic representation. According to the illustrated example, the second material 104 reproduces the circle 110A of the decoration 110.

The process described here envisages controlling dispensing of the second fluid material on the basis of the characteristics of the arrangement of the first foodstuff material already deposited on the foodstuff product 100. In this way, it is possible to guarantee that the two representations obtained with the first and second foodstuff materials, respectively, are co-ordinated with one another.

In particular, in preferred embodiments (FIGS. 1 and 7), the process described herein comprises:

- via a second camera 8, detecting the first fluid foodstuff material dispensed in the cavity 101 of the foodstuff product 100;
- on the basis of data obtained from detection by the camera 8, determining an area A1 in plan view of the first foodstuff material in the cavity 101 (step 205);
- determining a reference area A2 as a function of the area A1 determined previously (step 206);
- providing along the conveying line 2 a second unit 30 for dispensing a second fluid foodstuff material (step 207);
- selecting a set of nozzles of the second dispensing unit 30 through which to dispense the second fluid foodstuff material, as a function of the reference area A2 (step 208); and
- through the selected set of nozzles dispensing the second fluid material on the product for covering an area corresponding to the reference area A2, where the fluid foodstuff material is dispensed, through the selected nozzles, at respective pre-set times and while the foodstuff product 100 on the conveying line 2 advances underneath the plurality of rows of nozzles of the unit 30 (step 209).

In view of the foregoing, the process described here envisages controlling dispensing of the second material as a function of one or more characteristics of the area of the product covered by the first fluid foodstuff material.

The characteristic or characteristics considered and the control mode adopted depend upon the requirements of the specific applications.

With reference to the example described here, the second material is designed to provide a decoration concentric to the one obtained with the first material.

The control performed envisages determining an area A2 to be covered by dispensing the second material on the first material deposited in the cavity 101, the position and dimensions of which are a function of the position and dimensions of the area A1 of the first material so that the area A2 will fall in a pre-set position with respect to the area A1 of the first material and in a given dimensional ratio therewith.

As has been said, the characteristics analysed of the area A1 produced with the first material and the control mode envisaged depend upon the requirements of the specific applications. For instance, the position, shape, dimensions, etc., may represent some of the characteristics analysed of the area A1, and respect of a given position, geometry, proportion, shape, etc. may be the criteria of the control carried out for determining the area A2.

The dispensing unit 30 may present the same structure as the dispensing unit 10, and also the modes of control of the nozzles may substantially correspond to what has been described previously.

It should only be noted that in this case the operation of dispensing the second fluid material envisages only covering a pre-set area (equal to the area A2), and not filling a pre-defined volume. Consequently, the dispensing operation in question always and only envisages activation of an individual set of nozzles for depositing a single layer of material that defines the area A2.

On the other hand, it will be noted that the use of the cameras 4 and 8 also affords the advantage of enabling implementation of the process in which the foodstuff products to be decorated are supplied to the dispensing units 10 and 30 in a non-orderly and an altogether random way, in so far as the system can select the nozzles that are to dispense the fluid material according to the position of the foodstuff products on the conveying line 2.

As has been seen above, to carry out the process described herein the valve devices 20 associated to the nozzles 11' must be able to be controlled individually and independently of one another.

In preferred embodiments, like the one illustrated (see FIG. 4), the valve device 20 of each nozzle is provided with an electrically actuated open/close member.

Figure 5:
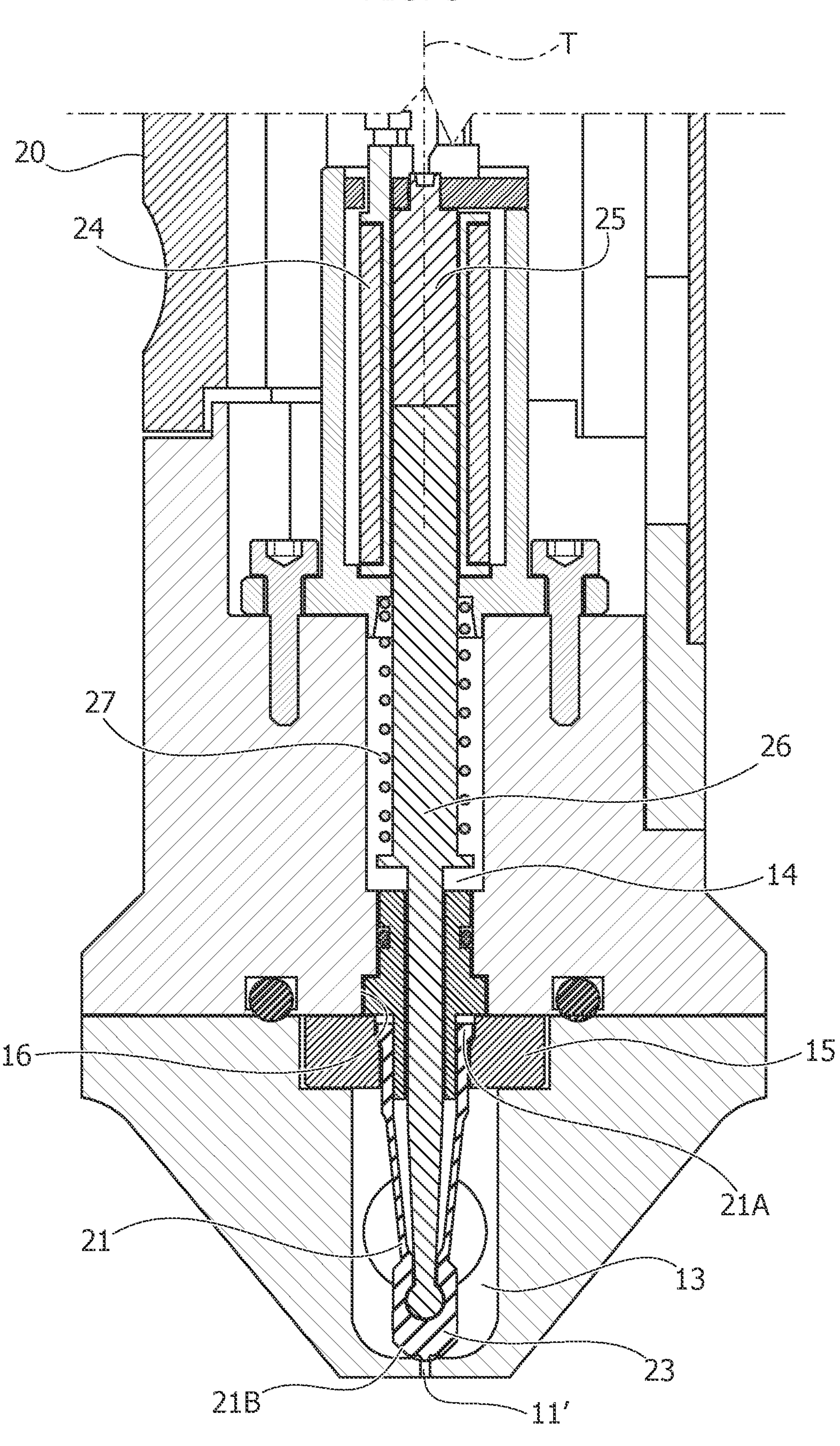
FIG. 5 is a cross-sectional view of a dispensing head of the dispensing unit of FIG. 3 according to the plane of section V-V indicated in FIG. 3.

In preferred embodiments, like the one illustrated (FIG. 5), the valve device 20 comprises an open/close member 21, which is constituted by a body made of elastic material having a generic hollow conformation that defines a perimetral rim 21A and a central region 21B.

The open/close member 21 is set within a duct 13 of the dispensing head 12, which supplies the foodstuff material to the nozzles 11' of the head.

The perimetral rim 21A is fixed in a position above the duct 13—as will be seen in greater detail in what follows—whereas the central region 21B is mobile within the duct 13 between a first, lowered, position, in which it closes the nozzle 11', preventing dispensing of the fluid foodstuff material therethrough, and a second, raised, position in which a passage opens through the nozzle for dispensing the fluid foodstuff material.

Movement of the central region 21B with respect to the perimetral rim 21A is allowed thanks to the elasticity of the body defining the open/close member 21.

The valve device 20 further comprises a solenoid 24 and a magnetic element 25, which is connected, via a rod 26, to the central region 21B of the open/close member and is mobile as a result of an electromagnetic interaction with the solenoid 24, in a reference direction T substantially orthogonal to the longitudinal direction of the duct 13.

The solenoid 24 and the magnetic element 25 are prearranged for driving in motion the central region 21B of the open/close member from the lowered position to the raised position, indicated above. A spring 27 acts on the magnetic element 25 to bring the central region 21B back into the lowered position.

In alternative embodiments, the solenoid 24, the magnetic element 25, and the spring 27, may be prearranged for operating exactly in the opposite way.

The control unit 6 is configured for driving the solenoids 24 of the valve devices 20 of the different nozzles 11' as a function of the optical readings made by the cameras 4 and 8, according to pre-set times that vary from one nozzle to another according to the criteria highlighted previously.

In preferred embodiments, like the one illustrated, the valve device 20 is housed within a seat 14 that is provided in the dispensing head 12 and extends in the reference direction T until it gives out into the duct 13 itself.

The perimetral rim 21A of the open/close member 21 is fixed via fixing members 15 at an opening 16 through which the seat 14 gives out into the duct 13 so that the open/close member 21 as a whole closes the opening 16 and thus separates the seat 14 and the valve device 20 contained therein from the duct 13.

It will understand that the open/close element 21 is hence prearranged for operating both as open/close member of the respective nozzle 11' and as sealing element of the seat 14 in which the valve device 20 is housed.

Figure 4:
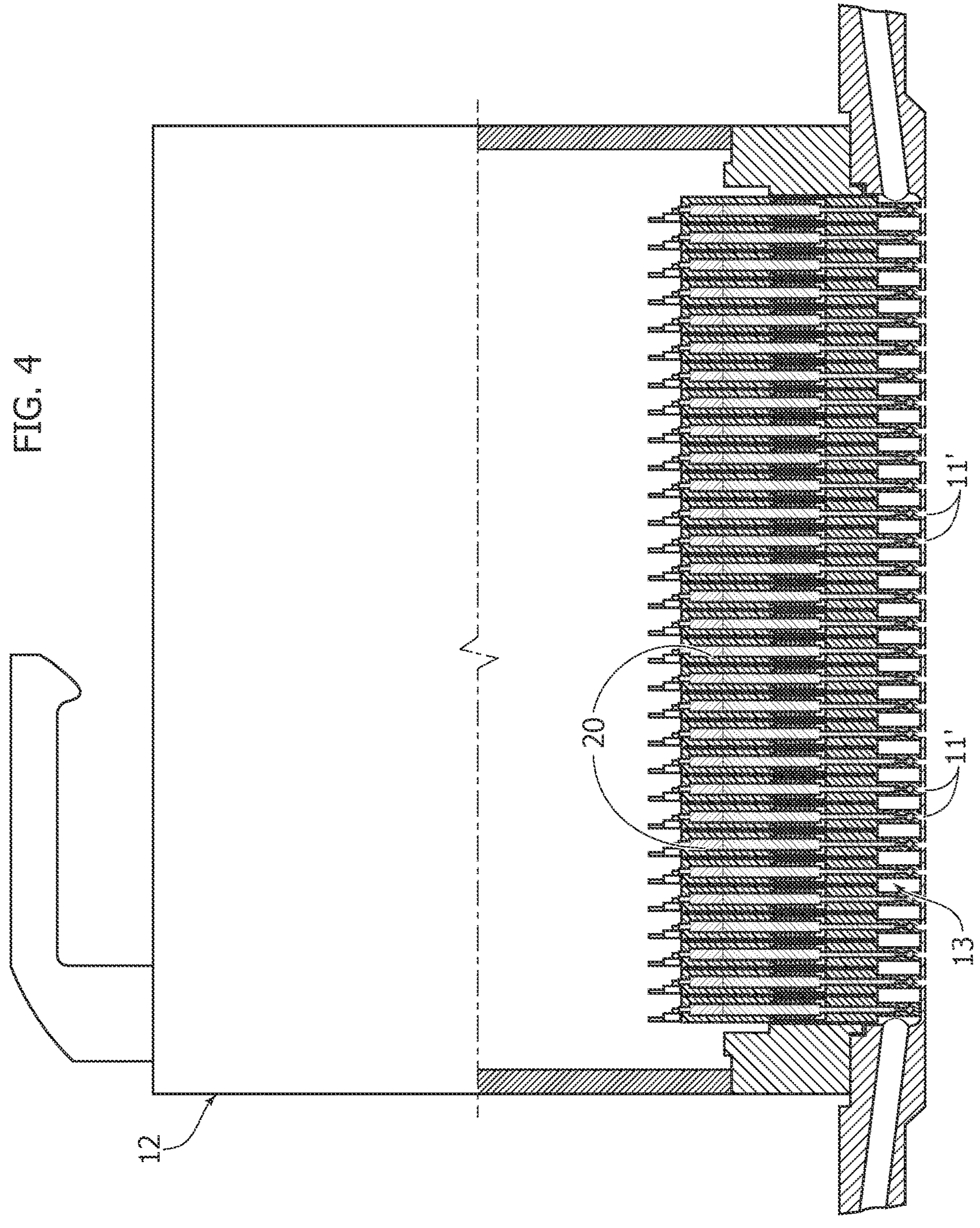
FIG. 4 represents a dispensing head of the dispensing unit of FIG. 3, in a cross-sectional view according to the plane of section IV-IV indicated in FIG. 3.

As may be seen in FIG. 4, the valve devices 20 of the different nozzles are mounted in the dispensing head 12, in the way indicated above, according to a mutual arrangement that reproduces the arrangement of the row of nozzles 11 in the duct 13.

Figure 3:
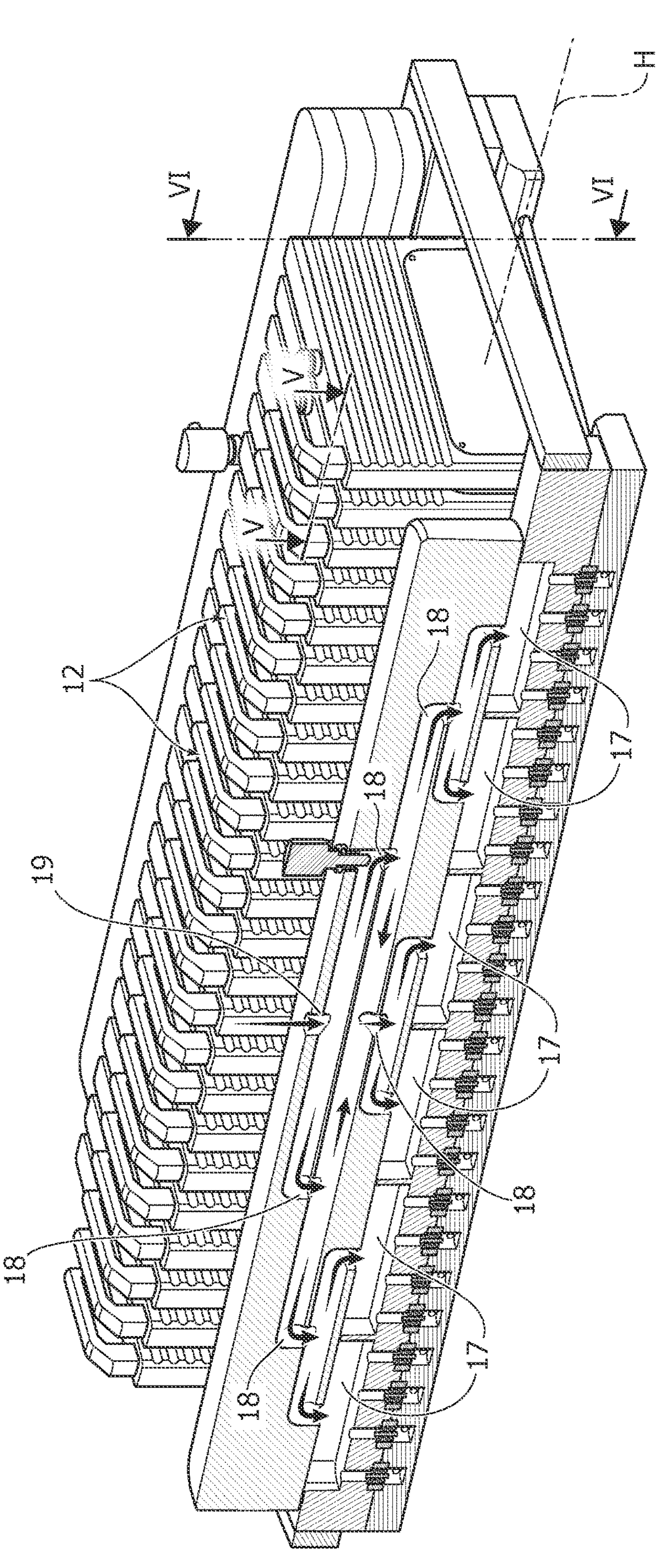
FIG. 3 shows a dispensing unit of the system of FIG. 1 according to a partially sectioned perspective view.

On the other hand, FIG. 3 represents a series of dispensing heads 12 in the direction H, and the system for supplying the foodstuff material to the respective ducts 13.

In preferred embodiments, like the one illustrated, the supply system comprises a plurality of chambers 17, distinct and separate, each of which supplies a respective subset of the series of dispensing heads 12.

The chambers 17 are supplied in parallel via a series of ducts 18 that depart from a common source 19 of foodstuff material.

The configuration described above makes it possible to determine within the ducts 13 pressures and rates of the flows of fluid foodstuff material that are considerably less fluctuating and more constant than the case in which the ducts 13 of all the dispensing heads 12 were, instead, supplied by a single chamber, this favouring dispensing of the fluid foodstuff material through the nozzles that is more precise and constant over time.

On the other hand, the present applicant has noted that, in the step of closing of the nozzle, the thrust of the central region 21B against the nozzle exerted by the magnetic element 25 causes a portion of the central region 21B to enter the hole of the nozzle, thus transmitting to the foodstuff material that is still within the aforesaid hole a pulse that facilitates exit thereof.

The present applicant has been able to note that the above action considerably improves dispensing of the fluid foodstuff material, in particular in applications where the amount of material to be dispensed is very small and the material itself has a high viscosity. In these conditions, the traditional devices operate, instead, with considerable difficulty since the small amounts to be dispensed tend to remain trapped within the holes of the nozzles on account of the high viscosity of the material.

In preferred embodiments, like the one illustrated, the central portion 21B may have an appendage 23 purposely prearranged for entering the hole of the nozzle 11'.

By way of example, with reference to FIGS. 2 and 8, the present applicant has conducted tests with a system having the following characteristics and operating in the conditions listed below:

D1=8 mm
D2=48 mm
D3=250 mm
Diameter of nozzles: from 0.5 mm
Q=7°
Rate of advance: 15 m/min
Material dispensed by the system: chocolate cream (viscosity of 1400 mPas and flow limit of 2 Pa)
Graphic resolution: 150 DPI.
The minimum volume dispensed is 0.05 g, for a dispensing time of 5 ms.

Finally, it should be noted that not necessarily does the system described herein need to be prearranged for implementing the process illustrated above so that components such as the camera 4 or the second dispensing unit 30 may even not be provided, and the system described herein may be used for carrying out normal dispensing processes, in any case affording the advantages highlighted above.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A process for producing foodstuff products provided with a respective decoration, comprising the steps of:

making a plurality of foodstuff products, each having a surface and at least a cavity made on said surface and having a profile in plan view that is predetermined to reproduce the respective decoration;

making said plurality of foodstuff products advance on a conveying line, in a direction of advance;

via a first camera, detecting, for each foodstuff product, the respective cavity;

on the basis of data obtained from detection by the first camera, determining one or more data indicating a volume of the cavity of the foodstuff product;

providing along said conveying line at least one unit for dispensing a fluid foodstuff material, comprising a plurality of rows of nozzles arranged in a direction transverse to said direction of advance;

selecting a set of nozzles of the plurality of rows of nozzles through which to dispense the fluid foodstuff material, as a function of the one or more data indicating a volume of the cavity determined previously;

through the set of nozzles selected, dispensing in the cavity of each foodstuff product an amount of fluid foodstuff material substantially equal to the volume of the cavity of the foodstuff product, wherein the fluid foodstuff material is dispensed, through the selected nozzles, at respective pre-set times and while the product on the conveying line advances underneath the plurality of rows of nozzles, wherein determining one or more data indicating a volume of the cavity includes determining an area in plan view and a depth of the cavity;

and wherein selecting a set of nozzles includes:

identifying a first set of nozzles for covering at least the bottom of the cavity, as a function of the area determined; and identifying a number of further sets of nozzles for completing filling of the entire volume of the cavity, as a function of the depth determined and of the rate of advance of the products in the direction of advance.

2. The process according to claim 1, wherein the making the plurality of foodstuff products includes making on said surface of each foodstuff product a cavity having a depth lower than 2 mm.

3. The process according to claim 1, comprising:

via a second camera, detecting the foodstuff material deposited in the cavity;

on the basis of data obtained via detection by the second camera, determining an area in plan view of the foodstuff material contained in the cavity;

determining a reference area as a function of the area determined previously;

providing along said conveying line a second unit for dispensing a second fluid foodstuff material, comprising a second plurality of rows of nozzles arranged in a direction transverse to said direction of advance;

selecting a set of nozzles of the second dispensing unit through which to dispense the second fluid foodstuff material, as a function of the reference area;

through the selected set of nozzles dispensing the second fluid material on the product to cover an area corresponding to the reference area, wherein the foodstuff material is dispensed, through the selected nozzles, at respective pre-set times and while the product on the conveying line advances underneath the plurality of rows of nozzles.

4. The process according to claim 1, wherein said plurality of rows of nozzles comprises rows of nozzles oriented in respective directions parallel to one another and transverse to the direction of advance of the conveying line.

5. The process according to claim 1, wherein said plurality of rows of nozzles has a matrix configuration that extends in the direction of advance and in a direction orthogonal thereto.

6. The process according to claim 1, wherein said plurality of rows of nozzles enables a graphic resolution of the material deposited on the foodstuff product of at least 70 DPI.

7. The process according to claim 1, wherein said dispensing unit comprises a valve device associated to each individual nozzle and designed to control the flow of the foodstuff material through the nozzle, and wherein said process includes controlling the valve devices individually and according to respective pre-set times that vary from nozzle to nozzle as a function of the position of the nozzle within said plurality of rows of nozzles.

8. The process according to claim 7, wherein each valve device is electrically actuated.

9. The process according to claim 1, wherein said plurality of rows of nozzles comprises rows of nozzles oriented in respective directions parallel to one another and transverse to the direction of advance of the conveying line, according to an angle comprised between 3° and 15°.

10. The process according to claim 1, wherein said plurality of rows of nozzles comprises rows of nozzles oriented in respective directions parallel to one another and transverse to the direction of advance of the conveying line, according to an angle comprised between 7° and 10°.

11. The process according to claim 1, wherein the respective pre-set times at which the fluid foodstuff material is dispensed through the selected nozzles are determined as a function of the position of the individual nozzle within the at least one unit for dispensing the fluid foodstuff material.

12. The process according to claim 11, wherein the respective pre-set times at which the fluid foodstuff material is dispensed through the selected nozzles are further determined as a function of the rate of advance of the products in the direction of advance.

13. A system for producing foodstuff products provided with a respective decoration, comprising:

a unit for making a plurality of foodstuff products each having a surface and a cavity made on said surface and having a profile in plan view that is predetermined to reproduce the respective decoration;

a conveying line for feeding a plurality of foodstuff products in a direction of advance;

at least one camera for detecting the foodstuff products that advance on the conveying line along the direction of advance;

at least one unit for dispensing the foodstuff material in the cavities made on the foodstuff products advancing on the conveying line, wherein the dispensing unit comprises a plurality of rows of nozzles arranged in a direction transverse to the direction of advance; and a control unit configured to control the dispensing unit as a function of data indicating the respective volumes of the single cavities, obtained from detection of the foodstuff products made by the at least one camera, comprising a memory unit containing a sequence of instructions that can be executed by the control unit for implementing the process according to a process for producing foodstuff products provided with a respective decoration, the process comprising the steps of:

making a plurality of foodstuff products, each having a surface and at least a cavity made on said surface and having a profile in plan view that is predetermined to reproduce the respective decoration;

making said plurality of foodstuff products advance on a conveying line, in a direction of advance;

via the at least one camera, detecting, for each foodstuff product, the respective cavity;

on the basis of data obtained from detection by the at least one camera, determining one or more data indicating a volume of the cavity of the foodstuff product;

providing along said conveying line at least one unit for dispensing a fluid foodstuff material, comprising a plurality of rows of nozzles arranged in a direction transverse to said direction of advance;

selecting a set of nozzles of the plurality of rows of nozzles through which to dispense the fluid foodstuff material, as a function of the one or more data indicating a volume of the cavity determined previously;

through the set of nozzles selected, dispensing in the cavity of each foodstuff product an amount of fluid foodstuff material substantially equal to the volume of the cavity of the foodstuff product, wherein the fluid foodstuff material is dispensed, through the selected nozzles, at respective pre-set times and while the product on the conveying line advances underneath the plurality of rows of nozzles, wherein determining one or more data indicating a volume of the cavity includes determining an area in plan view and a depth of the cavity;

and wherein selecting a set of nozzles includes:

identifying a first set of nozzles for covering at least the bottom of the cavity, as a function of the area determined; and identifying a number of further sets of nozzles for completing filling of the entire volume of the cavity, as a function of the depth determined and of the rate of advance of the products in the direction of advance.

14. The system according to claim 13, wherein said plurality of rows of nozzles comprises rows of nozzles oriented in respective directions parallel to one another and transverse to the direction of advance of the conveying line.

15. The system according to claim 13, wherein said plurality of rows of nozzles has a matrix configuration that extends in the direction of advance and in a direction orthogonal thereto.

16. The system according to claim 13, wherein said dispensing unit comprises a valve device associated to each individual nozzle and designed to control the flow of the foodstuff material through the nozzle.

17. The system according to claim 13, wherein said plurality of rows of nozzles comprises rows of nozzles oriented in respective directions parallel to one another and transverse to the direction of advance of the conveying line, according to an angle comprised between 3° and 15°.

18. The system according to claim 13, wherein said plurality of rows of nozzles comprises rows of nozzles oriented in respective directions parallel to one another and transverse to the direction of advance of the conveying line, according to an angle comprised between 7° and 10°.

* * * * *